(12) United States Patent
Ribeiro et al.

(10) Patent No.: US 8,518,369 B2
(45) Date of Patent: Aug. 27, 2013

(54) ZEOLITE IMPREGNATED WITH TITANIUM DIOXIDE

(75) Inventors: Flavio Ernesto Ribeiro, Plainfield, IL (US); Gary A. Baird, Marysville, IN (US); Ronaldo dos Santos Flor, São Bernardo do Campo (BR)

(73) Assignee: PQ Corporation, Malvern, PA (US)

( * ) Notice: Subject to any disclaimer, the term of this patent is extended or adjusted under 35 U.S.C. 154(b) by 1 day.

(21) Appl. No.: 13/538,166

(22) Filed: Jun. 29, 2012

(65) Prior Publication Data

US 2013/0000510 A1 Jan. 3, 2013

Related U.S. Application Data

(60) Provisional application No. 61/502,547, filed on Jun. 29, 2011, provisional application No. 61/543,136, filed on Oct. 4, 2011.

(51) Int. Cl.
*C01B 39/06* (2006.01)

(52) U.S. Cl.
CPC .................................. *C01B 39/065* (2013.01)
USPC ....................................................... 423/700

(58) Field of Classification Search
USPC ....................................................... 423/700
See application file for complete search history.

(56) References Cited

U.S. PATENT DOCUMENTS

| | | | |
|---|---|---|---|
| 2,859,184 A | 11/1958 | Ashley et al. | |
| 3,329,481 A | 7/1967 | Young et al. | |
| 4,220,567 A | 9/1980 | Kindervater et al. | |
| 4,264,562 A | 4/1981 | Kostinko | |
| 4,433,196 A | 2/1984 | Yang et al. | |
| 4,649,036 A | 3/1987 | Pastorello et al. | |
| 4,661,334 A | 4/1987 | Latourrette et al. | |
| 4,752,341 A | 6/1988 | Rock | |
| 5,346,546 A | 9/1994 | Kaliski | |
| 5,385,753 A | 1/1995 | Hu et al. | |
| 5,474,754 A * | 12/1995 | Saxton et al. | 423/705 |
| 5,487,882 A | 1/1996 | Hu et al. | |
| 5,755,870 A | 5/1998 | Ravishankar | |
| 6,258,768 B1 | 7/2001 | Araya | |
| 6,569,394 B2 | 5/2003 | Fischer et al. | |
| 6,656,347 B2 | 12/2003 | Stockwell et al. | |
| 6,746,659 B2 * | 6/2004 | Pinnavaia et al. | 423/702 |
| 6,843,977 B2 * | 1/2005 | Pinnavaia et al. | 423/702 |
| 6,869,906 B2 * | 3/2005 | Pinnavaia et al. | 502/182 |
| 7,128,892 B2 * | 10/2006 | Pinnavaia et al. | 423/700 |
| 2005/0135994 A1 * | 6/2005 | Frerichs et al. | 423/610 |
| 2007/0137526 A1 | 6/2007 | Hager et al. | |

OTHER PUBLICATIONS

DuPont Ti-Pure Titanium Dioxide for Coatings Booklet.
"New Generation Kaolin-Based Pigment Extenders," by L. Ashek, published in 2003 in Surface Coatings International.
International Search Report and Written Opinion dated Aug. 19, 2012 for International Appln. No. PCT/US12/44944.

* cited by examiner

*Primary Examiner* — David M Brunsman
(74) *Attorney, Agent, or Firm* — Buchanan Ingersoll & Rooney PC

(57) ABSTRACT

Embodiments of the invention relate to methods for making and compositions including zeolite with an impregnated titanium dioxide. Such zeolite/titanium dioxide compositions may be useful, for example, as a substitute or extender for titanium dioxide used in coatings.

6 Claims, 7 Drawing Sheets

ZEOLITE IMPREGNATED WITH TITANIUM DIOXIDE

CROSS-REFERENCE TO RELATED APPLICATIONS

This application claims priority to U.S. Provisional Patent Application No. 61/502,547, filed on Jun. 29, 2011, and to U.S. Provisional Patent Application No. 61/543,136, filed on Oct. 4, 2011. Those applications are incorporated by reference herein.

BACKGROUND OF THE INVENTION

1. Field of the Invention

Embodiments of the invention relate to methods and compositions for formation of zeolite impregnated with titanium dioxide ($TiO_2$). Such modified zeolites may be useful, for example, as a substitute or extender for titanium dioxide used in coatings.

2. Description of the Related Art

Various uses and formulations of titanium dioxide and substitutes for titanium dioxide are reported in the art. For example, the DuPont™ Company provides a variety of titanium dioxide coatings for various applications under the trade name Ti-PURE, as reported, for example, in the DUPONT Ti-PURE Titanium Dioxide for Coatings Booklet, which is incorporated by reference herein. (Both DUPONT and Ti-PURE are trademarks of DuPont.) Use of kaolin extenders for these and other titanium dioxide products are reported in the paper "New Generation Kaolin-Based Pigment Extenders," by L. Ashek, published in 2003 in *Surface Coatings International*. Titanium dioxide is used in significant amounts in the decorative coatings sector, where it is used for the protection and decoration of buildings. In fact, titanium dioxide is so important that it is sometimes called "white gold," because it is the raw material that contributes most to the increase in opacity and coverage of water-based paints. Titanium dioxide has a high refractive index (2.73 for rutile, 2.55 for anatase). This causes it to act as a white pigment, scattering or bending light. With enough titanium dioxide in a paint or coating, almost all visible light is reflected causing the coating to appear white, bright, and opaque.

Titanium dioxide is typically provided in a delivery vehicle. This may be, for example, water, vinyl resin, or acrylic resin. These compounds may have refractive indexes between 1.3 and 1.49. The greater the difference between the refractive indexes of the delivery vehicle and the refractive index of the titanium dioxide, the greater the light-scattering effect.

Size of titanium dioxide may be relevant to its efficacy. For example, typical titanium dioxide particles have a particle diameter of between 0.2 and 0.4 microns. This is about half the wavelength of light at which brightness and opacity are measured.

Dispersion of titanium dioxide is also important to performance as a brightener and opacity-creating agent. Flocculation of titanium dioxide is undesirable because it results in a larger effective particle size, decreasing the refractive effect.

Because of the expense associated with the use of titanium dioxide, effort has been expended to find substitutes or extenders. The choice of extender depends largely on the properties to be enhanced or controlled in a paint formulation. Blends of extenders may be used depending on the properties that are desired. The primary classes of titanium dioxide extenders are carbonates, silicates, sulfates, kaolins and oxides. Their particle sizes typically range from 0.01 to 44 microns. A high-gloss white paint usually contains only $TiO_2$; a semi gloss paint contains $TiO_2$ and some extender pigments; a flat paint contains $TiO_2$ but has a high extender content.

The ability of a material to act as an extender to titanium dioxide is governed in part by the size of the particles in the extender. Extenders that are too large may crowd the titanium dioxide. Extenders that are too small may overly disperse the titanium dioxide. In either case the efficacy of the overall composition may be diminished.

Coatings properties are directly related to pigment volume concentration, or PVC. These properties include, for example, gloss, permeability, porosity, hiding power, tinting strength and undertone. Because a dry paint film is a three-dimensional structure, the volume relationships among its components have an impact on paint performance. PVC is the ratio, by volume, of all pigments in the paint to total non-volatiles in the paint.

At a particular PVC, called the critical pigment volume concentration (CPVC), many physical and optical properties of paint change abruptly. Typically CPVC is the PVC where there is just sufficient binder to coat pigment surfaces and provide a continuous phase throughout the film.

$$\% \text{ PVC} = \{\text{Pigment volume}(TiO2 + \text{extenders})\} / \{\text{Pigment volume} + \text{volume of binders}\} * 100$$

Typically, PVC calculation has included only the pigment and the binder. It not account for the air voids present in the coating. In many paint coatings, air voids are intentionally added using a structured pigment. This improves optical properties of the pigment. To account for volume of air voids, the PVC equation would be altered to include the void volume.

As air voids are incorporated into a paint film as a result of formulating highly pigmented coatings above the CPVC, the average refractive index of the vehicle matrix decreases. This increases the refractive index difference between the pigment and surrounding medium, increasing light scattering. Formulators often use dry flat hiding to improve hiding of low-gloss flat interior architectural finishes.

In addition to $TiO_2$ and a delivery vehicle, many paints contain extender pigments. White extender pigments are mineral compounds of relatively low refractive index. They differ in composition, size and shape. White extender pigments develop very little hiding in gloss and semi-gloss paints. However, they contribute dry-flat hiding (air-pigment interface) to paints at low cost and are used to control gloss, texture, suspension, and viscosity.

According to the 2008 Chemicals Economics Handbook for Titanium Dioxide, In the United States, 50-60% of $TiO_2$ is consumed in paints and coatings, 20-25% in plastics, 10-15% in paper and 5-10% in all other uses.

Titanium dioxide is by far the most widely used white pigment in plastics. Virtually all plastics have some applications that require $TiO_2$. The major portion of titanium dioxide pigment consumption is accounted for by the huge commodity thermoplastics, including polyolefins (primarily low-density polyethylenes), polystyrene, polyvinyl chloride (PVC) and ABS (acrylonitrile-butadiene-styrene copolymer). Titanium dioxide pigments are incorporated into plastics to provide whiteness and opacity. In some applications, such as outdoor PVC siding, higher loadings (12%-22%) are used for ultraviolet light protection and improved dimensional properties. White plastic packaging films and containers for food, beverage, personal care and other consumer goods also contain $TiO_2$ to provide an opaque, white, bright appearance to display printed graphics.

The most commonly used pigment for papermaking is kaolin clay, sometimes in combination with calcium carbonate. Titanium dioxide is used in higher-quality products to impart opacity and brightness. Three segments of the paper market account for the bulk of $TiO_2$ consumption: (1) Coated printing and writing papers (accounts for 50% of all $TiO_2$ use), which includes high-end magazines and advertisements. $TiO_2$ allows magazines to take advantage of lighter weight papers while maintaining a quality product with clean, white, bright pages, and allows catalogers to display their products on pages that maximize the true look of their merchandise without the degrading interference of print showthrough. (2) Bleached and coated paperboard (25%), including packaging used for foods and beverages, detergents and tissues. Coated board, coated recycled board, and whitetop corrugated linerboard packaging all use $TiO_2$ in their surface coating to provide the highly opaque, bright, clean, white coated surface enabling high quality printed graphics. (3) Uncoated printing and writing papers (20%) which includes copy paper and form bonds.

Titanium dioxide pigments are also used in a number of natural and synthetic elastomer products. The two largest elastomer markets for $TiO_2$ are white sidewalls for passenger tires and rubber footwear. Other elastomer products that contain $TiO_2$ include floor mats, gloves, rainwear, wall coverings and sports equipment. The $TiO_2$ content of white sidewall formulations varies from 8% to almost 20% for applications in which high ozone resistance is desired. Up to 15% $TiO_2$ is recommended for white stock thermoplastic elastomers, for UV protection as well as improved color. Primarily anatase-grade $TiO_2$ is used by the elastomer industry. Consumption of $TiO_2$ for tires is believed to account for about one-half of elastomeric consumption of $TiO_2$.

Some white printing inks may contain as much as 55% $TiO_2$ by weight (primarily rutile), which is substantially more than typical white paints. Many light-colored inks also require a substantial amount of $TiO_2$ for their formulation. All of the major ink types—flexographic, rotogravure, letterpress and lithographic—consume some $TiO_2$, although lithographic and specialty ink categories, such as screen process inks, are minor markets for $TiO_2$.

Titanium dioxide is used as a component of porcelain enamels and glazes for metals, ceramics and specialty glasses. In general, non pigmentary grades of $TiO_2$ are used in ceramic applications; they differ from pigmentary grades in that they have larger particle sizes and the surface of the particle is untreated. Titanium dioxide is incorporated into frits (the glassy material that is the major component of porcelain enamels and glazes) in varying amounts up to 20%. Frits are applied to metal substrates and then fired at around 700° C.; upon recrystallization, the coating appears white and opaque. $TiO_2$ is also incorporated into white dry-process enamels for cast iron. The $TiO_2$ content of these enamels is only 4-8%. If pastels or colored enamels are desired, rutile mineral is used to supply the $TiO_2$ because it is less expensive. $TiO_2$ in glazes for ceramics can serve as an opacifier, to provide resistance to acids and for special surface texture (semimattes). $TiO_2$ pigment is incorporated into glasses, including reflective beads, to increase opacity. Other $TiO_2$ markets are as follows:

Floor coverings. This category includes titanium dioxide consumed only in resilient floor tiles and sheet goods. Typically, these floor coverings contain 2-4% $TiO_2$ by weight, although some products have a much lower content.

Coated fabrics and textiles. Rutile-grade pigments are generally preferred for the coated fabric market, which includes artificial leather, oil cloth, upholstery material and wall coverings.

Roofing granules. $TiO_2$ is also used as a component of roofing materials to increase light reflectance and to provide flame retardance and thermal insulation. Among the many other miscellaneous applications of titanium dioxide pigments are adhesives and sealants, artist's colors and crayons, building materials (e.g., ceiling tiles), cement-curing aids, natural leather, shoe dressings and soap.

Specialty cements or concretes. Where whiteness in final appearance is required, these compositions may benefit from inclusion of $TiO_2$.

Some grades of $TiO_2$ comply with FDA requirements and are used as food color additives and by the cosmetics industry, in which $TiO_2$ may comprise as much as 20% by weight of some products such as face makeup; lower percentages are used for sunscreens, eye shadow, lip makeup and other products. There has been some increase in use in the sunscreen industry as $TiO_2$ is more effective at providing protection from UV-A radiation.

Unfortunately, use of titanium dioxide imposes a high cost for raw materials; in some cases it may be ten times more expensive than other raw materials in the same formulation. Therefore, having more economical technical options is of great interest to this market. Currently, it is very common to use other raw materials to substitute titanium dioxide, even if only partially. These solutions may be of limited utility, since the coverage that they offer may not be of quality (either related to opacity or coverage or both) of titanium dioxide.

Use of titanium dioxide in combination with zeolites has been reported. U.S. Pat. No. 4,220,567 to Kindervater et al. for "Stabilizing Pigmented Lacquers with Zeolites" reports the use of zeolites in lacquer containing iron oxide or titanium dioxide pigments to improve the dispersion and prevent flocculation of said pigments or other fillers.

U.S. Pat. No. 4,433,196 to Yang et al. for "Color Precursor Removal from Detergent Range Alkyl Benzenes" reports a method for removing color precursors from detergent range alkyl benzenes with an adsorbent. The adsorbent contains a bauxite clay with titanium dioxide, mixing said clay with sulfuric acid followed by calcination, and a crystalline zeolite.

U.S. Pat. No. 4,752,341 to S. Rock for "Pigment System for Paper" reports a combination of titanium dioxide and zeolite providing improved optical properties when included in paper. Zeolite A is modified to exchange sodium for calcium and blended with titanium dioxide pigment.

U.S. Pat. No. 5,385,753 to Hu et al. for "Process for Reactively Coating Particles" reports a process to make $TiO_2$-Zeolite coated particles to be used as a replacement for $TiO_2$ pigment. The product is obtained from a natural or synthetic zeolite reaction with titanium tetra chloride (or titanium ether or esters) in an inert atmosphere such as nitrogen, and in a water-immiscible liquid environment such as heptanes.

U.S. Pat. No. 5,474,754 to Saxton et al. for "Preparation of an Aluminosilicotitanate Isomorphous with Zeolite Beta" reports a method for synthesizing molecular sieves isomorphous with zeolite beta with titanium atoms on their framework. The product is obtained by reacting silicon/aluminum/titanium compounds in acid condition followed by a treatment with quaternary tetraethyl ammonium species in a solvent to form an impregnated co-gel.

U.S. Pat. No. 6,569,394 to Fischer et al. for "Catalyst Body and Process for Breaking Down Nitrogen Oxides" reports a catalyst body for breaking down nitrogen oxides with an active material that contains zeolite and titanium dioxide. The zeolite is a hydrogen-ion-exchanged in which the cations have been exchanged by hydrogen ions. This zeolite is mixed with an active component containing titanium dioxide.

Zeolites are micro porous crystalline solids with well-defined structures. Generally they contain silicon, aluminum and oxygen in their framework and cations (such as $Na^+$, $K^+$, $Ca^{2+}$, $Mg^{2+}$ and others), water and/or other molecules within their pores. These positive ions are rather loosely held and can readily be exchanged for others in a contact solution. Many zeolites naturally as minerals and are extensively mined in many parts of the world. Others are synthetic, and are made commercially for specific uses. An example mineral formula for a zeolite is: $Na_2Al_2Si_3O_{10}$-$2H_2O$, which is the formula for natrolite.

There are several types of synthetic zeolites that form by a process of slow crystallization of a silica-alumina gel in the presence of alkalis and organic templates. The product properties depend on reaction mixture composition, pH of the system, operating temperature, pre-reaction 'seeding' time, reaction time as well as the templates used. Preparation of synthetic zeolites suitable for use in embodiments of the invention is shown, for example, in U.S. Pat. No. 4,661,334, to Latounnette, et al. ("Preparation of Zeolites 4A and/or 13X"); U.S. Pat. No. 4,649,036 to Pastorello, et al. ("Process for the Manufacture of Zeolites 4A . . . "); U.S. Pat. No. 5,487,882 to Hu, et al. ("Process for Preparation of Zeolite 13X"); U.S. Pat. No. 6,258,768, to Araya ("Zeolite P . . . "); and U.S. Pat. No. 4,264,562, to Kostinko ("Method of Producing Zeolite Y").

Synthetic zeolites hold some key advantages over their natural analogs. The synthetics can, of course, be manufactured in a uniform, phase-pure state. It is also possible to manufacture desirable zeolite structures which do not appear in nature. Zeolite A is a well-known example. Examples of synthetic zeolites are the A, P, X and/or Y types. One example of a type A zeolite has the chemical formula $Na_2O$:$2SiO_2$:$Al_2O_3$:$3.94H_2O$, wherein the quantity of $Na_2O$ is 17%, $Al_2O_3$ is 29%, $SiO_2$ is 34% and $H_2O$ is 20%. U.S. Pat. No. 4,264,562, to Kostinko gives a description of different synthetic zeolite types.

Zeolites can also be made from kaolins or other sources containing alumina. Kaolin clays or pigments are naturally occurring hydrated aluminum silicates of the approximate formula $Al_2O_3$.$2SiO_2$.$XH_2O$, wherein X is usually 2. Kaolinite, nacrite, dickite and halloysite are species of minerals in the kaolin group. U.S. Pat. No. 6,656,347, to Stockwell et al. "Structurally Enhanced Cracking Catalysts" describes the preparation of zeolite from ultra fine calcined hydrous kaolin, with or without the presence of sodium silicate and sodium (or potassium) hydroxides to form zeolite.

The general formula for zeolites can be expressed by $Na_2O$:$\chi SiO_2$:$Al_2O_3$:$\gamma H_2O$. Zeolite X will have $\chi=2.5\pm0.5$, Zeolite A will have $\chi=1.85\pm0.5$, Zeolite Y will have $\chi=4.5\pm1.5$. U.S. Pat. No. 6,258,768 (Arraya) describes the typical formula for Zeolite P where $\chi$ will vary from 1.80 up to 2.66. The water content on the structure, represented by $\gamma$ is variable and can reach up to 9. Typical values of $\gamma$ for Zeolite X are 6.2 and Zeolite A is 3.91. In some embodiments the value of $\gamma$ is in a range of 3 to 9 for synthetic grades.

It would be helpful to have a zeolite that includes titanium dioxide as an impregnated component. By "impregnated" it is meant that the titanium dioxide is incorporated into the crystal structure either as part of the crystal structure or chemically attached to the surface of the crystal, resulting in a strong bond link that would not represent a simple physical mixture of zeolite and titanium dioxide, for example. Such a zeolite could act as an extender or replacement for titanium dioxide in coatings.

BRIEF SUMMARY OF THE INVENTION

Embodiments are presented herein that provide synthetic zeolite that includes impregnated titanium dioxide introduced during the initial stage of production of the zeolite. During the initial stage, where the sodium silicate is not yet combined with sodium aluminate (provided by the combination of ATH-aluminum trihydrate and caustic soda) for the formation of zeolite molecule, the titanium dioxide is subjected to dispersion in the sodium aluminate solution or alternatively the sodium silicate solution. The next stages of the zeolite production would then be the addition of stoicheometric sodium aluminate and sodium silicate to form the zeolite molecule followed by crystallization at higher temperatures. Addition of the titanium dioxide at a separate step is also possible.

The following steps are one general example of how the formation of this zeolite impregnated with $TiO_2$ may occur:
1) Prepare a Sodium Aluminate solution combining ATH-aluminum trihydrate, water and caustic soda,;
2) Add $TiO_2$ with agitation;
3) Combine the Sodium Aluminate/$TiO_2$ solution with dilute Sodium Silicate;
4) Heat to form zeolite crystals;
5) Filter and wash the slurry, and dry the cake to produce a free-flow powder.

In some embodiments the method steps comprise the listed components, and in others they consist essentially of them.

A more specific example proceeds as follows:
1) Weigh out 38% ATH-Aluminum Trihydrate at room temperature, pump to reactor and start agitation;
2) Weigh out Water and pump into the reactor containing the ATH solution;
3) Weigh out 50% Caustic and pump into the reactor containing the ATH solution and Water;
4) Mix contents for an additional 30 minutes. This will result on a Sodium Aluminate solution;
5) With agitation, add the appropriate amount of $TiO_2$ to the Sodium Aluminate solution;
6) Mix contents for at least 30 minutes or until $TiO_2$ is fully dispersed;
7) Weigh out dilute sodium silicate at room temp and pump slowly to the Sodium Aluminate/$TiO_2$ solution;
8) Mix at room temperature for 30 minutes; this is a gel ageing step;
9) Heat mixture to 200° F. (93.3° C.) and hold at 200° F. (93.3° C.) for 60 minutes; this is a crystallization step;
10) Cool slurry to 150° F. (65.5° C.) or less by quenching with soft water or DI water if available;
11) Filter slurry and wash with 150° F. (65.5° C.) deionized/soft water at 2 lb water/lb (.90 kg water/0.45 kg)product; and
12) Dry product to a free flowing powder.

"Caustic soda" as used herein is a synonym for sodium hydroxide.

The above processes may be varied at the stoichiometric level of $Al_2O_3$:$SiO_2$ mass ratio or changing the process conditions such as introducing a seed zeolite crystal before the crystallization step to provide different zeolites with the impregnated titanium dioxide.

Although embodiments of the invention are reported herein in the context of coatings we believe that, because of their properties, compositions reported herein could be used for the other markets and applications for which titanium dioxide is useful. This includes but is not limited to the many uses and industries reported herein.

DETAILED DESCRIPTION OF THE INVENTION

Figure 1:
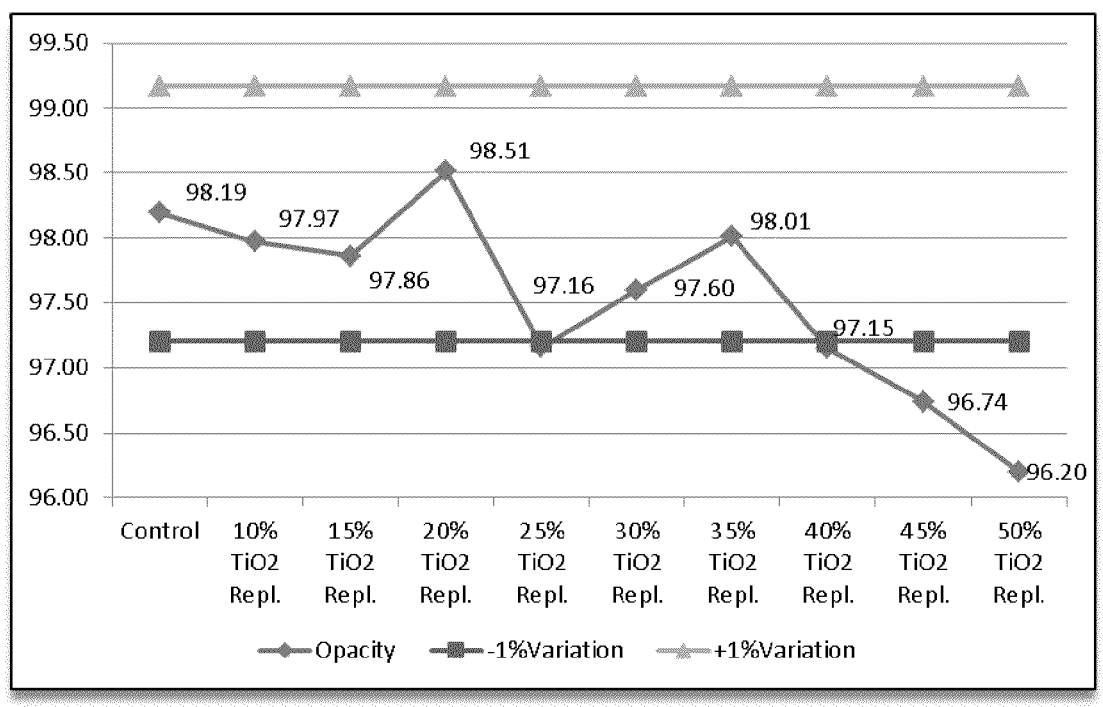
FIG. 1 shows percent opacity on a 3-4 mils dry film thickness application of the compositions shown in Example 2, Table 6. The horizontal line between 99.0 and 99.5 represents +1% variation, while the horizontal line between 97.0 and 97.5 represents −1% variation.
Figure 2:
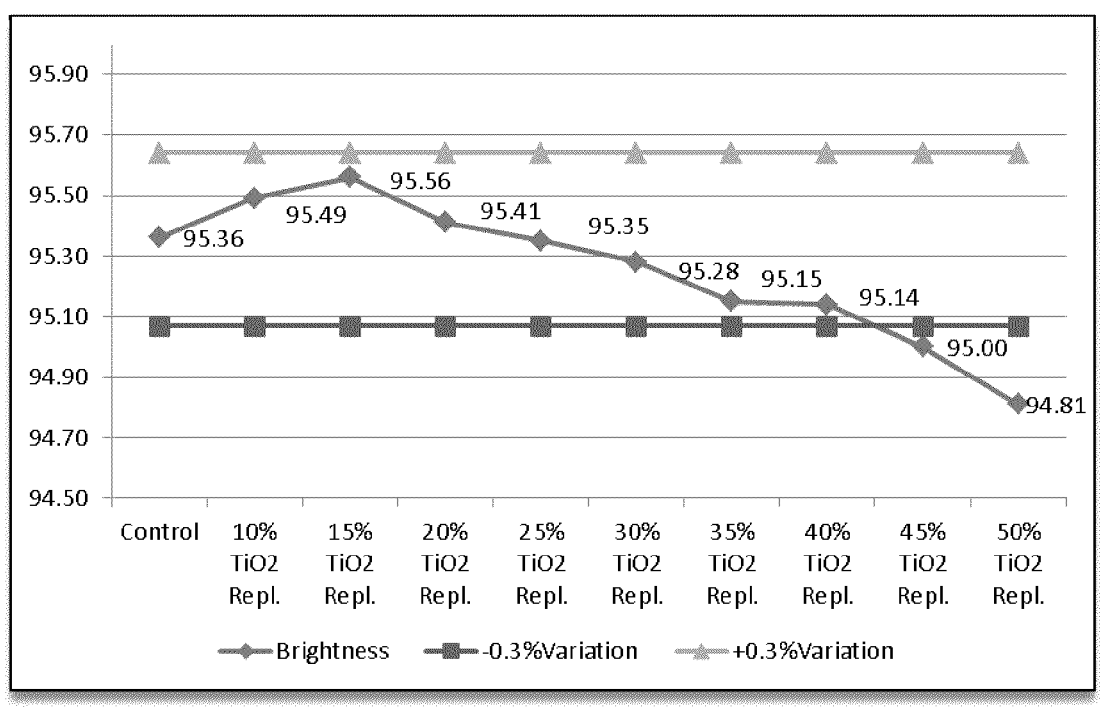
FIG. 2 shows percent brightness on a 3-4 mils dry film thickness application of compositions shown in Example 2, Table 6.
Figure 3:
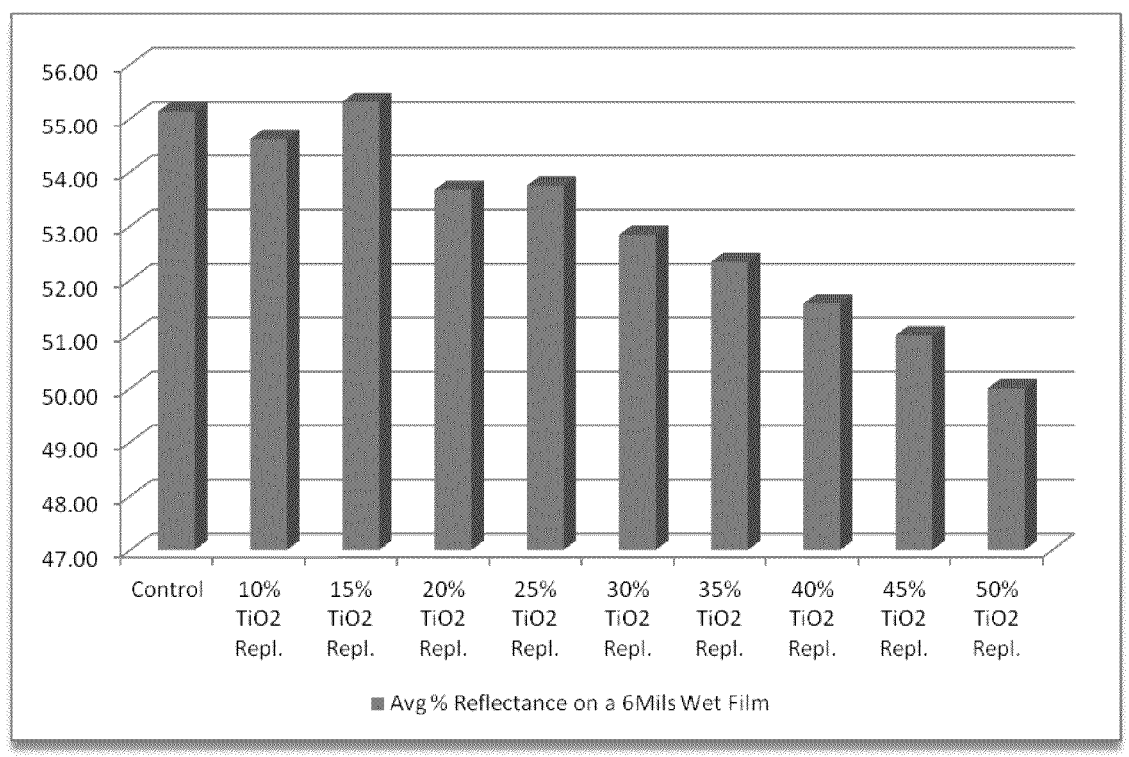
FIG. 3 shows tint strength at a base 63 g of white base plus 3 g of black colorant according to Example 2.
Figure 4:
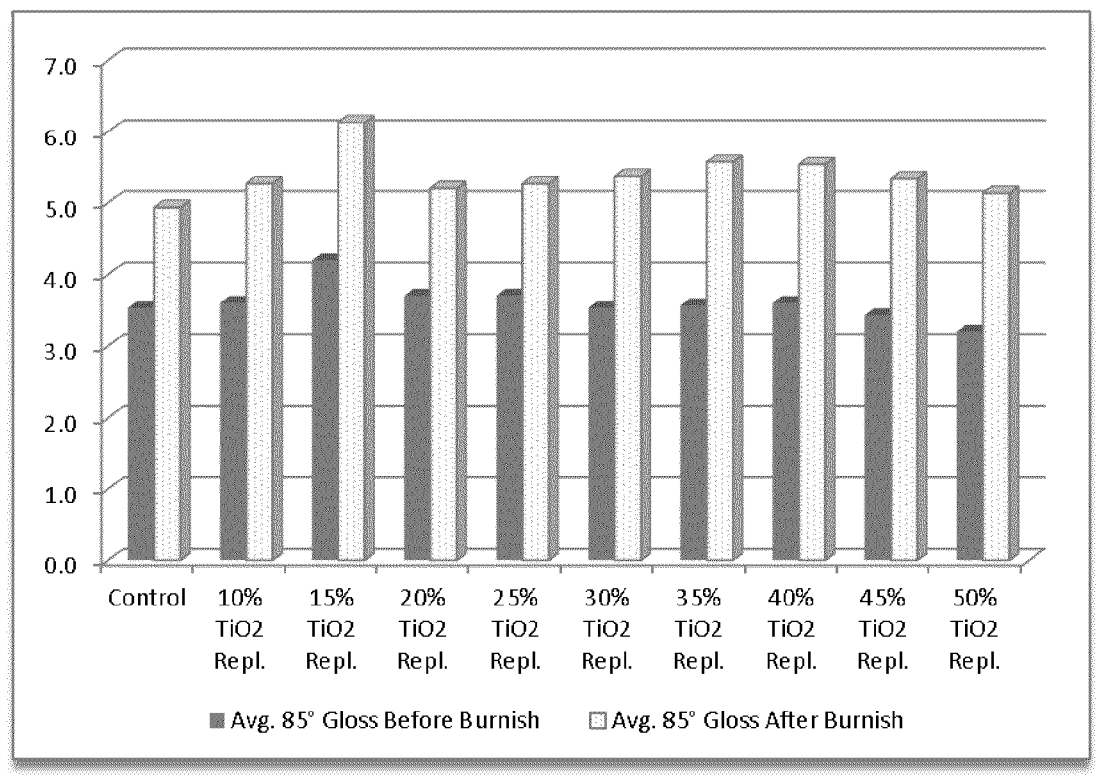
FIG. 4 shows burnish resistance of compositions of Example 2 according to ASTM D6736-08, which is incorporated by reference herein.

Embodiments of the invention provide addition of titanium dioxide particles into synthetically made zeolites, where the particles are integrated into the zeolite crystal structure. The resulting zeolite crystal with $TiO_2$ impregnation has the ability to partially replace titanium dioxide pigment in paint formulas or other applications, while maintaining optical properties of the titanium dioxide. This may provide for significant extension of the titanium oxide while simultaneously providing a composition with many of the beneficial properties of zeolite alone.

In one embodiment, a high performance zeolite-based product for the partial replacement of $TiO_2$ in paints has been provided. This offers significant cost savings. This zeolite-based product shows improved hiding capability relative to zeolite without $TiO_2$, controlled particle size, and controlled crystal morphology, and provides optimum spacing and $TiO_2$ extension. The effect and amount of the titanium dioxide impregnated into the zeolite may vary depending on the properties of the non-impregnated zeolite. In some embodiments the amount of titanium dioxide impregnated into the zeolite is, by weight of total composition, 1%-50%, 1%-25%, 1%-15%, 1%-10%, 1%-5%, 5%-10%, 5%-15%, 5%-25%, 10%-25%, 10%-50%, or 25%-50%, with the balance being zeolite with or without incorporated water and other ingredients that those skilled in the art will recognize are typically included in zeolite compositions.

The zeolite-based product provides superior wet hiding when compared with other extenders. It provides a spacing effect of $TiO_2$ pigment in paint formulas with no detrimental effect on optical properties. Fine particle size of the zeolite-based product results in relatively low gloss reduction. It possesses low oil absorption characteristics, which results in lower binder demand and lower changes on paint viscosity. Its high hydrophilicity aids ease of dispersion even when replacing high percentages of $TiO_2$. Its low specific gravity results in lower paint density when replacing $TiO_2$ and pigment extenders, offering cost savings.

Various amounts of titanium dioxide may be substituted for by titanium dioxide extenders of the instant disclosure. For example, between 1% and 50% of titanium dioxide, by weight, may be substituted; between 1% and 25%, between 1% and 10%, between 5% and 25%, and between 5% and 10% may be substituted. In some embodiments the amount of titanium dioxide that is substituted with titanium dioxide extender is 1%, 3%, 5%, 7%, or 10%.

Typical properties of the zeolite-titanium dioxide composition are set forth in Table 1, below:

TABLE 1

| | |
|---|---|
| Average Particle Size (Malvern Mastersizer) | 3.0-4.0μ |
| Loss at 800° C. | 18-21% |
| Specific Gravity | 2.0-2.3 |
| pH (1% aqueous solution) | 10.5-11.5 |
| Oil absorption (Linseed) | 20-30 g/100 g |
| Color (L Brightness) | 97-98% |
| Bulk Density | 30-50 Lb/ft$^3$ |
| Retained on 325 mesh screen | <0.5% |

Although Applicant does not wish to be bound by theory, it is believed that the change in performance occurs because the titanium dioxide is chemically and physically included in the final zeolite crystal. This appears to be confirmed, for example, by washing the final zeolite-based product cake and analyzing the contents of the residual water. Residual washing water has no appreciable titanium dioxide. Given the relatively large size of the titanium dioxide particle relative to the zeolite, if the titanium dioxide were not incorporated into the zeolite it would likely flow through the filter cloth and be present in a high concentration in the residual water. Tests have shown that is not the case.

Laboratory experiments have demonstrated that the sequence of addition during preparation of embodiments of the invention is important on product performance. When the titanium dioxide pigment is added to the sodium aluminate solution followed by the sodium silicate addition and crystallization the results proved to be unexpectedly better that the addition of titanium dioxide pigment in the sodium silicate followed by the addition of the sodium silicate to the sodium aluminate and crystallization. The performance is also different than pure zeolite samples and physically blended zeolite and titanium dioxide samples. This indicates that that a specific incorporation of the titanium particle in the zeolite crystal has resulted in improved properties to be used as a $TiO_2$ extender.

One skilled in the art will recognize that the source of titanium dioxide used in embodiments of the invention is not critical. Useful sources of titanium dioxide include, for example, rutile, anatase, brookite and the like. Although not required, the typical crystal size of a $TiO_2$-Zeolite particle typically is between 2 and 3 microns.

Embodiments of the invention will best be understood with reference to an example directed to production of one or more embodiments of the invention. In the examples, a rich sodium aluminate crystallization process of 4A zeolite is described. For one skilled in the art the zeolite crystallization process can be run either on silicate rich or aluminate rich environments, where the unreacted materials after the crystallization process is completed are recycled back to new batches.

With respect to the synthesis of zeolite using the kaolin as a raw material it is believed that the $TiO_2$ should be added and dispersed in the alkali (sodium or potassium) hydroxides prior to crystallization.

Although not required, in a typical formulation 4A zeolite will include 20% water as a final product. In those applications (such as coatings) where water at this level is acceptable, no adjustment to water content needs to be made. For applications where the presence of water is undesirable (for example, in plastics), the zeolite may be calcined to remove all or substantially all (greater than 95%) of the water. In some embodiments the final zeolite-titanium dioxide product will include less than 20% water, less than 10% water, less than 5% water, or less than 1% water.

Table 2, below, shows an example that may be used for production of 150 Lb (68 kg) of 4A zeolite. Incorporation of $TiO_2$ is done on a mass basis of the final product, being for example 8 Lb (3.6 kg) $TiO_2$ if a desired 5% $TiO_2$ level is required in the final product.

TABLE 2

| Ingredients | WEIGHT | |
|---|---|---|
| | lb | (kg) |
| Sodium silicate | 200.0 | (90.7) |
| Sodium hydroxide(50%) | 52.5 | (23.8) |
| Water | 520.0 | (235.9) |
| 38% ATH—Aluminum Trihydrate | 230.0 | (104.3) |
| Totals | 1002.5 | (454.7) |

Embodiments of the invention may be further appreciated through consideration of examples. The scope of the claims should not be construed to be limited to any particular example unless so indicated in the claims.

Example 1 provides seven comparative examples of compositions designated (A) through (G).

In example (A) 4.54 Kg of sodium aluminate (SA) solution was added to a beaker at room temperature. 32 grams of titanium dioxide pigment was added to the SA solution and mixed for 30 minutes. 1.13 Kgs of sodium silicate solution (JL) was slowly added to the SA/$TiO_2$ mixture, in room temperature, and mixed for another 30 minutes. The resulting mixture was heated up to 93° C. and this temperature was held for 30 minutes. The resulting slurry was filtered and washed with approximately 3 liters of DI water at 65° C. The cake was then dried at 100° C. and ground to a fine powder. The example (A) produced a $TiO_2$ impregnated 4A zeolite crystal that had 3.5% $TiO_2$ concentration by weight as a final product.

In example (B) 4.54 Kg of sodium aluminate (SA) solution was added to a beaker at room temperature. 64 grams of titanium dioxide pigment was added to the SA solution and mixed for 30 minutes. 1.13 Kgs of sodium silicate solution (JL) as slowly added to the SA/$TiO_2$ mixture, in room temperature, and mixed for another 30 minutes. The resulting mixture was heated up to 93° C., and this temperature was held for 30 minutes. The resulting slurry was filtered and washed with approximately 3 liters of DI water at 65° C. The cake was then dried at 100° C. and ground to a fine powder. The example (B) produced a $TiO_2$ impregnated 4A zeolite crystal that had 7.0% $TiO_2$ concentration by weight as final product.

In example (C) 4.54 Kg of sodium aluminate (SA) solution was added to a beaker at room temperature. 1.13 Kgs of sodium silicate solution (JL) was weighted on a separate beaker and 32 grams of titanium dioxide pigment was slowly added to the JL solution. The JL/$TiO_2$ mixture was slowly added to the SA solution, in room temperature, and mixed for 30 minutes. The resulting mixture was heated up to 93° C. and this temperature was held for 30 minutes. The resulting slurry was filtered and washed with approximately 3 liters of DI water at 65° C. The cake was then dried at 100° C. and ground to a fine powder. The example (C) produced a $TiO_2$ impregnated 4A zeolite crystal that had 3.5%$TiO_2$ concentration by weight as final product.

In example (D) 4.54 Kg of sodium aluminate (SA) solution was added to a beaker at room temperature. 1.13 Kgs of sodium silicate solution (JL) was weighted on a separate beaker and 64 grams of titanium dioxide pigment was slowly added to the JL solution. The JL/$TiO_2$ mixture was slowly added to the SA solution, in room temperature, and mixed for 30 minutes. The resulting mixture was heated up to 93° C. and this temperature is held for 30 minutes. The resulting slurry was filtered and washed with approximately 3 liters of DI water at 65° C. The cake was then dried at 100° C. and ground to a fine powder. The example (D) produced a TiO2 impregnated 4A zeolite crystal that has 7.0% $TiO_2$ concentration by weight as final product.

In example (E) 4.54 Kgs of sodium aluminate (SA) solution was added to a beaker at room temperature. 1.13 Kgs of sodium silicate solution (JL) was slowly added to the SA solution, in room temperature, and mixed for another 30 minutes. The resulting mixture was heated up to 93° C., and this temperature was held for 30 minutes. The resulting slurry was filtered and washed with approximately 3 liters of DI water at 65° C. The cake was then dried at 100° C. and ground to a fine powder. The example (E) produced a 4A zeolite crystal that includes no $TiO_2$ in the final product.

In example (F) the resulting powder from example (E) was physically blended with titanium dioxide pigment to provide a blended mixture that has an equivalent 3.5% $TiO_2$ by weight on its composition.

In example (G) the resulting powder from example (E) was physically blended to titanium dioxide pigment to provide a blended mixture that has an equivalent 7.0% $TiO_2$ by weight on its composition.

The powder samples were tested on typical dry wall architectural water based formulation. This formulation, which was used as the control without addition of any amount of examples (A) through (G), is used for interior dry wall application and has the following generic formula shown in Table 3:

TABLE 3

| Ingredient | % of total Mass |
|---|---|
| Water | 21.9% |
| Zinc Oxide | 2.3% |
| Talc | 6.3% |
| Minex 4 | 11.3% |
| Calcium Carbonate | 1.4% |
| TiO2 R-746 Slurry | 15.3% |
| Acrylic Latex | 35.7% |
| Additives | 5.8% |
| Total | 100% |

To determine the optical performance of each example composition as a TiO2 extender, 15% of the $TiO_2$ pigment in the control composition, by weight, was replaced with each of the examples cited above to assess their optical performance as a $TiO_2$ extender. Optical properties such as Opacity, Brightness, Reflectivity and 60 degrees Gloss were measured in 3-4 mils dry films to compare against the control formula. The results are expressed in Table 4 below.

TABLE 4

| Sample(s) | Opacity | Brightness | Reflectivity | 60 Deg Gloss |
|---|---|---|---|---|
| Control | 94.39 | 95.31 | 90.84 | 3 |
| (F) | 90.48 | 94.65 | 89.58 | 3 |
| (G) | 90.51 | 94.64 | 89.56 | 3 |
| (E) | 90.77 | 94.6 | 89.49 | 3 |
| (C) | 89.13 | 94.55 | 89.39 | 3 |
| (D) | 90.50 | 94.6 | 89.49 | 3 |
| (A) | 94.77 | 95.30 | 90.82 | 3 |
| (B) | 95.80 | 95.51 | 91.22 | 3 |

The table results show that there is a distinct performance of zeolite impregnated $TiO_2$ samples when the addition process is made via the sodium aluminate (SA) solution.

Example 2, below, reports testing of a further embodiments of the invention. Results of tests performed on the zeolite when used as in an architectural dry wall paint application are set forth below. Table 5 shows a composition of a dry wall paint into which the zeolite/titanium dioxide composition is placed for testing. Additives include, for example, surfactants, defoamers, anti-settling, thickeners, solvents, rheological agents and others.

PVC = 42%
Theoretical Density=11 Lb/Gal

TABLE 5

| | | |
|---|---|---|
| Water | 25.5% | 281 Lb |
| Zinc Oxide | 2.3% | 25 Lb |
| Talc | 6.3% | 70 Lb |
| Minex | 11.3% | 125 Lb |
| Calcium Carbonate | 1.4% | 15 Lb |
| $TiO_2$ Powder | 11.8% | 130 Lb |
| Latex Resin | 35.7% | 394 Lb |
| Additives | 5.8% | 63 Lb |

Table 6 shows embodiments of the invention in which various amounts of a zeolite/titanium dioxide composition are incorporated. The control includes only "free" titanium dioxide. In the other embodiments the listed percentage of free $TiO_2$ is replaced with the indicated amount of a zeolite/titanium dioxide compound, denoted in Table 6 as "impregnated zeolite."

TABLE 6

| Reformulation Examples | % $TiO_2$ | % impregnated zeolite | Lb $TiO_2$ (*) | Lb impregnated zeolite (*) | Density Lb/Ft³ | % PVC |
|---|---|---|---|---|---|---|
| Control | 11.8 | — | 130 | — | 11.06 | 42.08 |
| Replace 10% $TiO_2$ | 10.6 | 1.2 | 117 | 13 | 11.02 | 42.65 |
| Replace 15% $TiO_2$ | 10.0 | 1.8 | 110 | 20 | 11.01 | 42.94 |
| Replace 20% $TiO_2$ | 9.4 | 2.4 | 104 | 26 | 10.99 | 43.22 |
| Replace 25% $TiO_2$ | 8.8 | 3.0 | 97 | 32 | 10.97 | 43.50 |
| Replace 30% $TiO_2$ | 8.3 | 3.5 | 90 | 39 | 10.95 | 43.78 |
| Replace 35% $TiO_2$ | 7.7 | 4.1 | 84 | 45 | 10.93 | 44.06 |
| Replace 40% $TiO_2$ | 7.1 | 4.7 | 77 | 51 | 10.91 | 44.33 |
| Replace 45% $TiO_2$ | 6.5 | 5.3 | 71 | 58 | 10.90 | 44.60 |
| Replace 50% $TiO_2$ | 5.9 | 5.9 | 64 | 64 | 10.88 | 44.86 |

(*) based on a 100 Gal formula

Scrub resistance for compositions reported in Table 6 is shown in Table 7, where the Test method used is "Average Cycles to Failure."

TABLE 7

| ASTM D2486-06 Scrub Resistance | Test Method A Avg. Cycles to failure |
|---|---|
| Control | 122 |
| Replace 10% $TiO_2$ | 164 |
| Replace 15% $TiO_2$ | 165 |
| Replace 20% $TiO_2$ | 144 |
| Replace 25% $TiO_2$ | 137 |
| Replace 30% $TiO_2$ | 127 |
| Replace 35% $TiO_2$ | 126 |
| Replace 40% $TiO_2$ | 126 |
| Replace 45% $TiO_2$ | 124 |
| Replace 50% $TiO_2$ | 114 |

Note:
Avg. cycles are considered not significantly different within the accuracy of the test.

Practical washability according to ASTM D4828-94 (incorporated by reference herein) is shown in Table 8.

TABLE 8

| ASTM D4828-94 Practical Washability | Purple Crayon | Red Lipstick | Yellow Mustard | Gloss Change | Color Change | Erosion |
|---|---|---|---|---|---|---|
| Control | 0 | 7 | 3 | NG | SD | NE |
| Replace 10% $TiO_2$ | 0 | 7 | 3 | NG | SD | NE |
| Replace 15% $TiO_2$ | 0 | 7 | 3 | NG | SD | NE |
| Replace 20% $TiO_2$ | 0 | 7 | 3 | NG | SD | NE |
| Replace 25% $TiO_2$ | 0 | 7 | 3 | NG | SD | NE |
| Replace 30% $TiO_2$ | 0 | 7 | 3 | NG | SD | NE |
| Replace 35% $TiO_2$ | 0 | 7 | 3 | NG | SD | NE |
| Replace 40% $TiO_2$ | 0 | 7 | 3 | NG | SD | NE |
| Replace 45% $TiO_2$ | 0 | 7 | 3 | NG | SD | NE |
| Replace 50% $TiO_2$ | 0 | 7 | 3 | NG | SD | NE |

Washing process with liquid cleanser and mechanical method.
0—No change from original intensity of soil or stain
3—Slight change from original, but readily visible
7—Large change from original, barely visible
NG—No Gloss change
SD—Color Slightly Darker
NE—No erosion Table 9 shows porosity by staining according to ASTM D3258-054, which is incorporated by reference herein.

| ASTM D3258-04 Porosity by Staining | Avg. % Reflectance of Untested Film | Avg. % Reflectance of Penetrated Film | Difference |
|---|---|---|---|
| Control | 94.84 | 94.63 | (0.21) |
| Replace 10% $TiO_2$ | 94.86 | 94.70 | (0.16) |
| Replace 15% $TiO_2$ | 94.86 | 94.71 | (0.15) |
| Replace 20% $TiO_2$ | 94.56 | 94.40 | (0.16) |
| Replace 25% $TiO_2$ | 94.26 | 94.15 | (0.10) |
| Replace 30% $TiO_2$ | 94.36 | 94.19 | (0.17) |
| Replace 35% $TiO_2$ | 94.19 | 94.06 | (0.13) |
| Replace 40% $TiO_2$ | 94.14 | 93.99 | (0.16) |
| Replace 45% $TiO_2$ | 93.94 | 93.78 | (0.17) |
| Replace 50% $TiO_2$ | 93.37 | 93.23 | (0.14) |

The superior hiding properties of the zeolite impregnated with $TiO_2$, when compared with a non-impregnated zeolite (ADVERA® WMA), were also demonstrated. For this a paint formula was created where the only pigment present is the one to be evaluated. The formula is as described below in Table 10:

TABLE 10

| Paint Formula with Extender ONLY | Ingredient | Lb | Gal | Lb/Gal |
|---|---|---|---|---|
| Grind Phase | Water | 196.3 | 23.5938 | 8.32 |
| Run 10 min @5,000 rpm | Surfactant | 10.0 | 1.0989 | 9.10 |
| | Dispersant | 6.6 | 0.7424 | 8.89 |
| | Defoamer | 2.0 | 0.2632 | 7.60 |
| | Anti Settling | 3.0 | 0.1436 | 20.89 |
| | Extender | 250.0 | 13.9665 | 17.90 |
| | Organic Solvent | 9.4 | 1.1914 | 7.89 |
| | Water | 83.5 | 10.0240 | 8.33 |
| | Defoamer | 5.5 | 0.7237 | 7.60 |
| Thindown @1,500 rpm for 5 minutes | Acrylic Resin | 394.0 | 44.7727 | 8.80 |
| | Rheological Agent | 28.0 | 3.6842 | 7.60 |
| | TOTALS | 988.3 | 100.204 | |
| | Density | | 9.86 | |
| | PVC | | 42.04% | |

Figure 5:
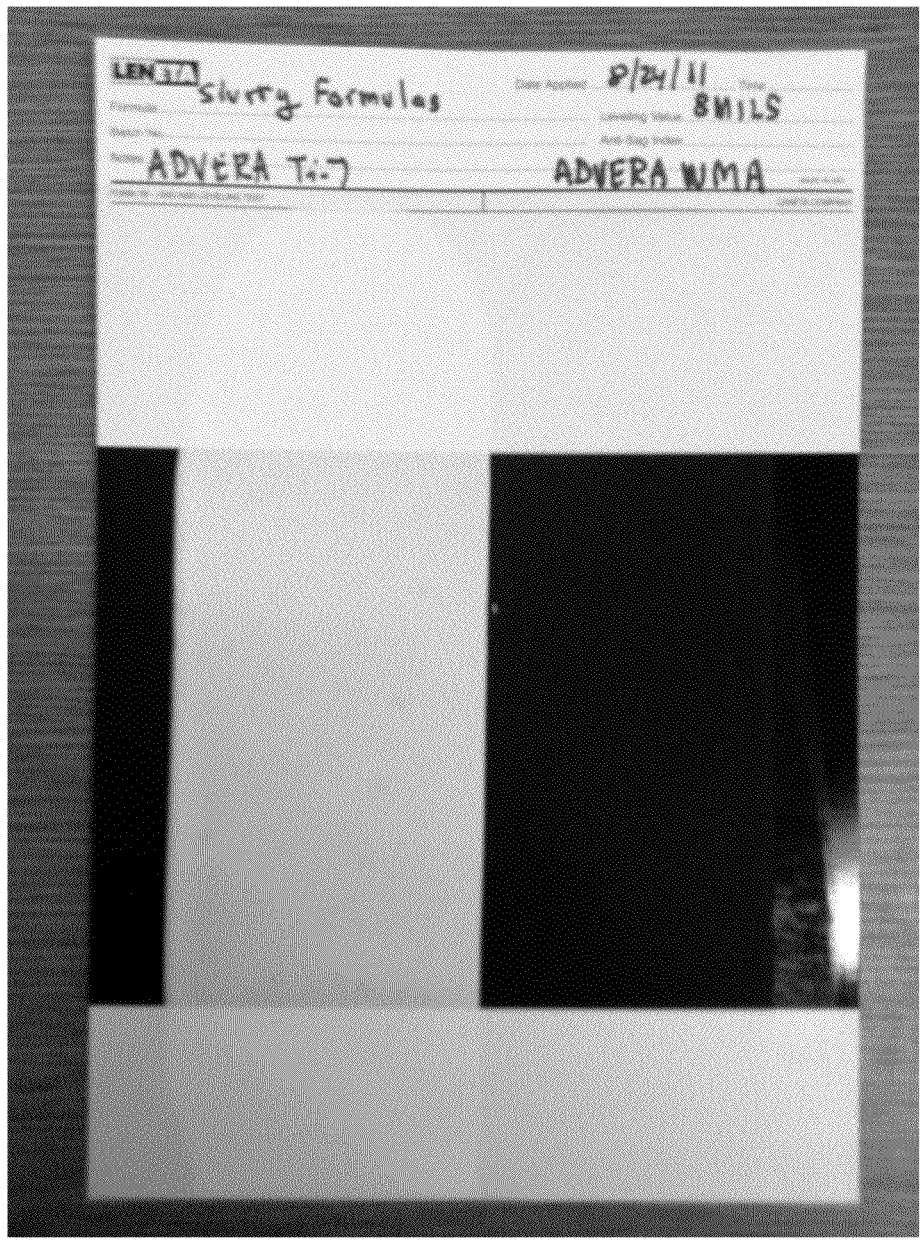
FIG. 5 shows a photograph of a transparency comparison reported in Example 2.

The photograph in FIG. 5 reflects a dry film made with a 8MILS Bird Bar applicator, with the impregnated zeolite (ADVERA® Ti7) on the left side and regular zeolite (ADVERA® WMA) on the right side. The improved hiding properties can be noted by the significant white appearance on the film with impregnated zeolite, while the other film is transparent as the pigment is not contributing to hide the film at this thickness.

Example 3 reports data on P zeolite samples made with various levels of TiO2 impregnation from 10% to 50%. The performance of the pigment was evaluated with a pigment formula as shown in Table 11. The selected pigment can be either the different zeolite/titanium dioxide samples reported above, or a pure titanium dioxide sample.

TABLE 11

| Paint Formula with Pigment ONLY | Ingredient | Lb | Gal | Lb/Gal |
|---|---|---|---|---|
| Grind Phase | Water | 196.3 | 23.5938 | 8.32 |
| | Surfactant | 10.0 | 1.0989 | 9.10 |
| | Dispersant | 6.6 | 0.7424 | 8.89 |
| | Defoamer | 2.0 | 0.2632 | 7.60 |
| | Anti Settling | 3.0 | 0.1436 | 20.89 |
| | Pigment | 250.0 | 13.9665 | 17.90 |
| | Organic Solvent | 9.4 | 1.1914 | 7.89 |
| | Water | 83.5 | 10.0240 | 8.33 |
| | Defoamer | 5.5 | 0.7237 | 7.60 |
| Thindown | Acrylic Resin | 394.0 | 44.7727 | 8.80 |
| | Rheological Agent | 28.0 | 3.6842 | 7.60 |
| | TOTALS | 988.3 | 100.204 | |
| | Density | | 9.86 | |
| | PVC | | 42.04% | |

TABLE 12

Table 12 reports optical results on a 6 Mils wet film.

| Pigment | Zeolite A + 9% TiO2 | Zeolite P + 10% TIO2 | Zeolite P + 26% TiO2 | Zeolite P + 33% TiO2 | Zeolite P + 40% TiO2 | Zeolite P + 50% TiO2 | DuPont R706 |
|---|---|---|---|---|---|---|---|
| Opacity | 83.87 | 87.81 | 95.21 | 95.89 | 97.08 | 97.88 | 99.27 |
| L* Brightness | 87.88 | 89.57 | 94.05 | 94.47 | 94.87 | 96.24 | 97.01 |
| a* | −1.44 | −1.35 | −1.21 | −1.23 | −1.25 | −1.27 | −1.28 |
| b* | −0.02 | −0.28 | 0.99 | 1.27 | 1.85 | 2.03 | 2.08 |

Figure 6:
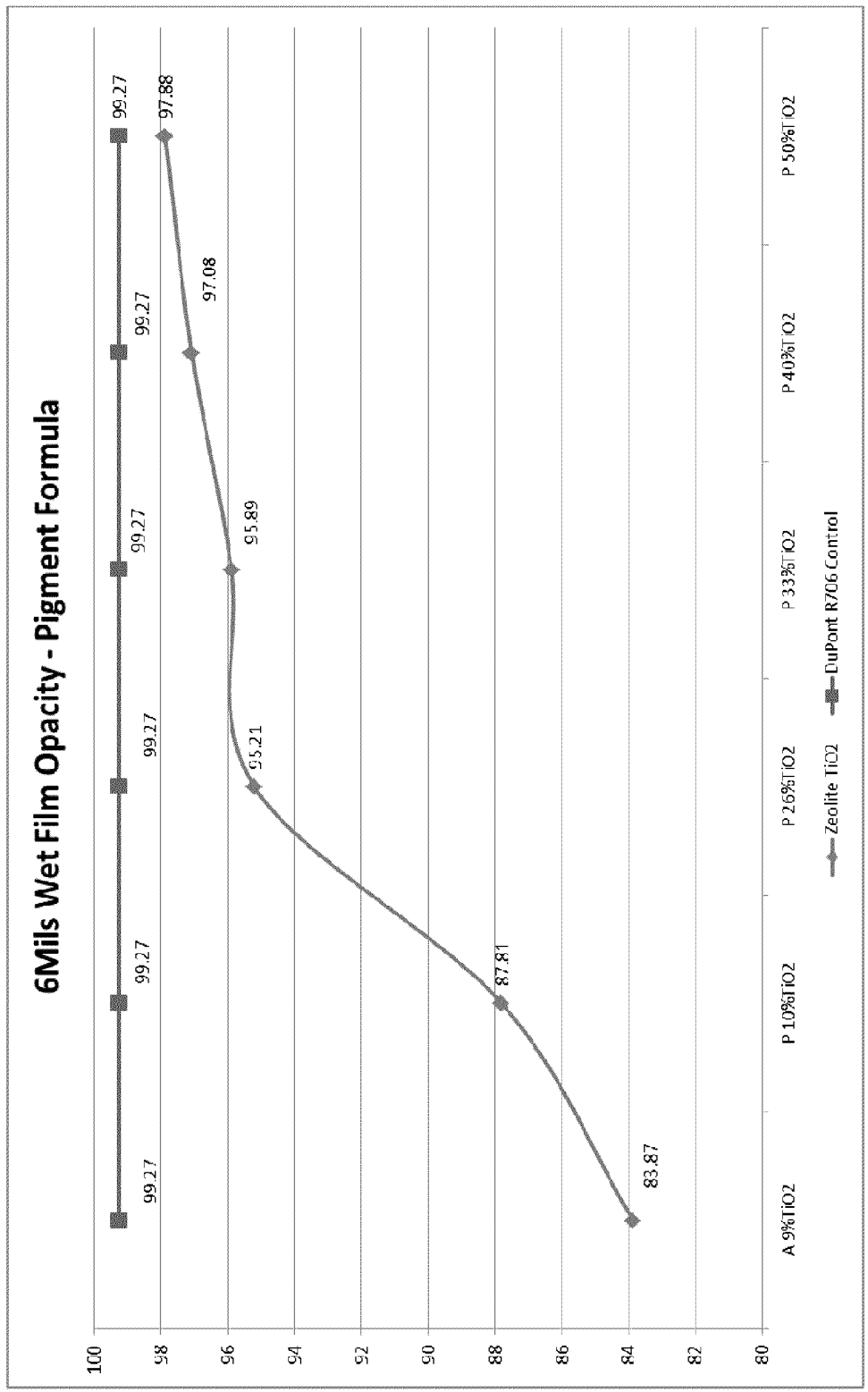
FIG. 6 shows wet film pigment opacity reported in Example 3.
Figure 7:
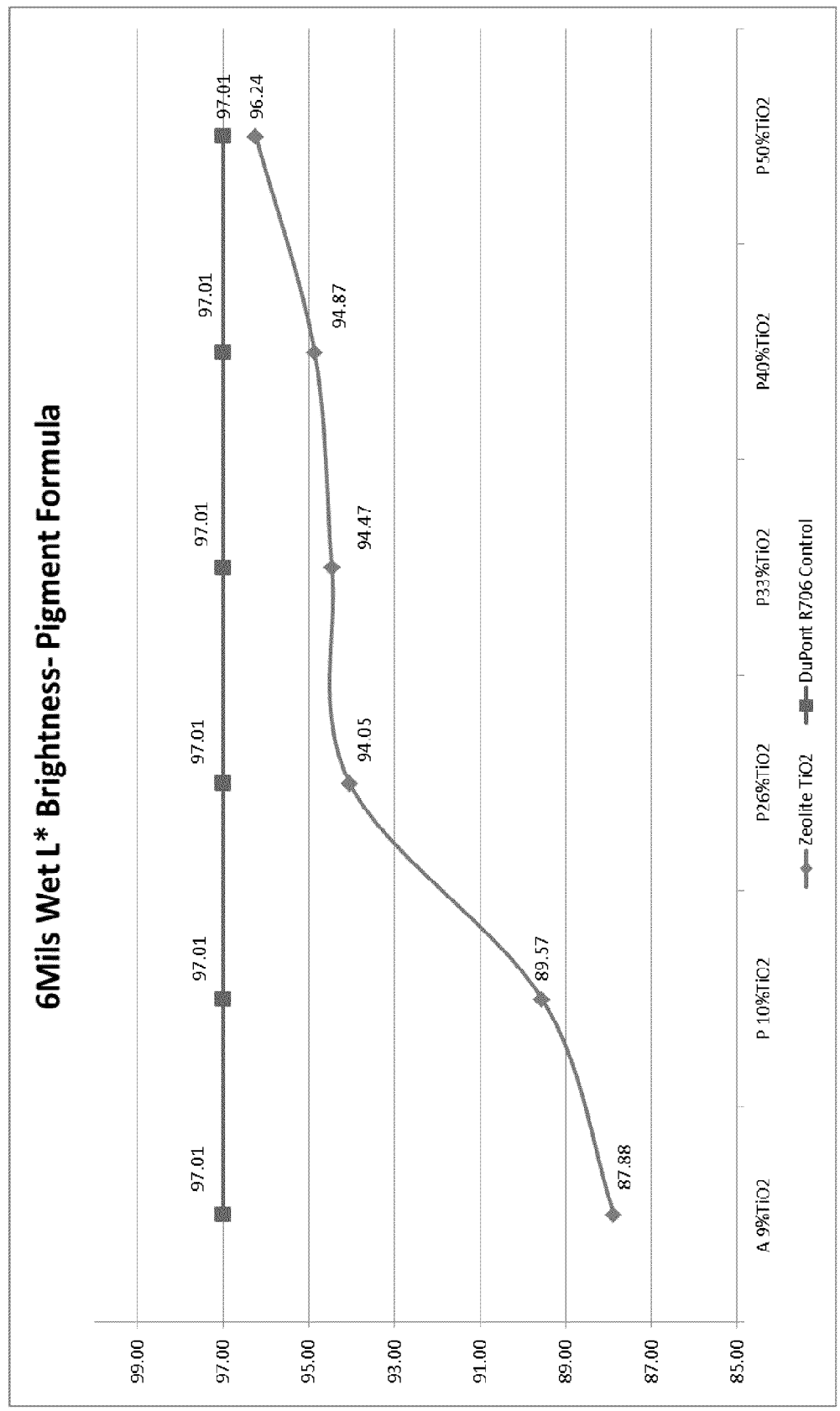
FIG. 7 shows wet L* brightness reported in Example 3.

These results are shown graphically in FIGS. 6 and 7.

Patents, patent applications, publications, scientific articles, books, web sites, and other documents and materials referenced or mentioned herein are indicative of the levels of skill of those skilled in the art to which the inventions pertain, as of the date each publication was written, and all are incorporated by reference as if fully rewritten herein. Inclusion of a document in this specification is not an admission that the document represents prior invention or is prior art for any purpose.

We claim:

1. A process for the preparation of powder of zeolite impregnated with titanium dioxide, comprising:
    preparing a sodium aluminate solution comprising ATH-aluminum trihydrate, sodium hydroxide, and water;
    adding titanium dioxide to the sodium aluminate solution with agitation;
    combining the sodium aluminate solution comprising ATH-aluminum trihydrate, sodium hydroxide, water, and titanium dioxide with sodium silicate;
    heating the solution comprising ATH-aluminum trihydrate, sodium hydroxide, water, titanium dioxide, and sodium silicate until the formation of a slurry comprising zeolite crystals impregnated with titanium dioxide; and
    filtering and washing the slurry and drying the cake to produce a powder of zeolite impregnated with titanium dioxide.

2. The process of claim 1, wherein the solution comprising aluminum trihydrate, sodium hydroxide, water, titanium dioxide, and sodium silicate includes those reagents in the following amounts by weight prior to heating:
    ATH-aluminum trihydrate at 10 to 40%;
    sodium hydroxide at 1 to 20%;
    water at 5 to 70%;
    titanium dioxide at 1 to 20%; and
    sodium silicate solution at 5 to 50%.

3. The process of claim 1, wherein the solution comprising aluminum trihydrate, sodium hydroxide, water, titanium dioxide, and sodium silicate includes those reagents in the following amounts by weight prior to heating:
    ATH-aluminum trihydrate at 15 to 25%;
    sodium hydroxide at 1 to 10%;
    water at 30 to 60%;
    titanium dioxide at 1 to 10%; and
    sodium silicate solution at 15 to 30%.

4. The process of claim 1, wherein the powder of zeolite impregnated with titanium dioxide includes, by weight, from 1% to 70% titanium dioxide and from 30% to 99% zeolite.

5. The process of claim 1, further comprising calcining said powder.

6. The process of claim 1, wherein said calcining results in said powder including an amount of water less than 5% of the powder by weight.

* * * * *